(12) United States Patent
Kolan et al.

(10) Patent No.: US 11,182,265 B2
(45) Date of Patent: Nov. 23, 2021

(54) METHOD AND APPARATUS FOR TEST GENERATION

(71) Applicant: International Business Machines Corporation, Armonk, NY (US)

(72) Inventors: Tom Kolan, Haifa (IL); Hillel Mendelson, Kibutts Hahotrim (IL); Vitali Sokhin, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 221 days.

(21) Appl. No.: 16/243,128

(22) Filed: Jan. 9, 2019

(65) Prior Publication Data

US 2020/0218624 A1 Jul. 9, 2020

(51) Int. Cl.
*G06F 11/263* (2006.01)

(52) U.S. Cl.
CPC .................. *G06F 11/263* (2013.01)

(58) Field of Classification Search
CPC .................................................. G06F 11/263
See application file for complete search history.

(56) References Cited

U.S. PATENT DOCUMENTS

| | | | |
|---|---|---|---|
| 7,945,888 B2 | 5/2011 | Adir et al. | |
| 8,832,502 B2 | 1/2014 | Dusanapudi et al. | |
| 8,892,386 B2 | 11/2014 | Adir et al. | |
| 9,720,792 B2 * | 8/2017 | Goswami | G06F 11/263 |
| 9,910,086 B2 | 3/2018 | Czamara et al. | |
| 2004/0163074 A1 * | 8/2004 | Decker | G06F 11/263 717/108 |
| 2005/0154551 A1 * | 7/2005 | Pramanick | G01R 31/318307 702/119 |
| 2008/0255822 A1 * | 10/2008 | Adir | G06F 11/263 703/21 |
| 2008/0319729 A1 * | 12/2008 | Copty | G06F 11/263 703/17 |
| 2009/0259454 A1 * | 10/2009 | Adir | G06F 11/263 703/17 |

(Continued)

OTHER PUBLICATIONS

Pacheco, Carlos et al., "Feedback-directed Random Test Generation", Jan. 19, 2007, ICSE 2007, pp. 1-33 (Year: 2007).*

*Primary Examiner* — Matthew M Kim
*Assistant Examiner* — Indranil Chowdhury
(74) *Attorney, Agent, or Firm* — Gregory J Kirsch

(57) ABSTRACT

A method, system and computer program product, the method comprising: obtaining a test template comprising a multiplicity of elements, including a first element and another element; generating a partially instantiated test template comprising a first instance for the first element and the another element in an uninstantiated form; generating, based on the partially instantiated test template, a first test complying with the test template, the first test comprising the first instance for the first element and an instance for the another element; executing the first test to obtain a first result; generating, based on the partially instantiated test template, a second test complying with the test template, the second test comprising the first instance for the first element and another instance for the another element, thereby using the first instance for generating the first and second tests; and executing the second test to obtain a second result.

19 Claims, 2 Drawing Sheets

(56) References Cited

U.S. PATENT DOCUMENTS

Figure 1:
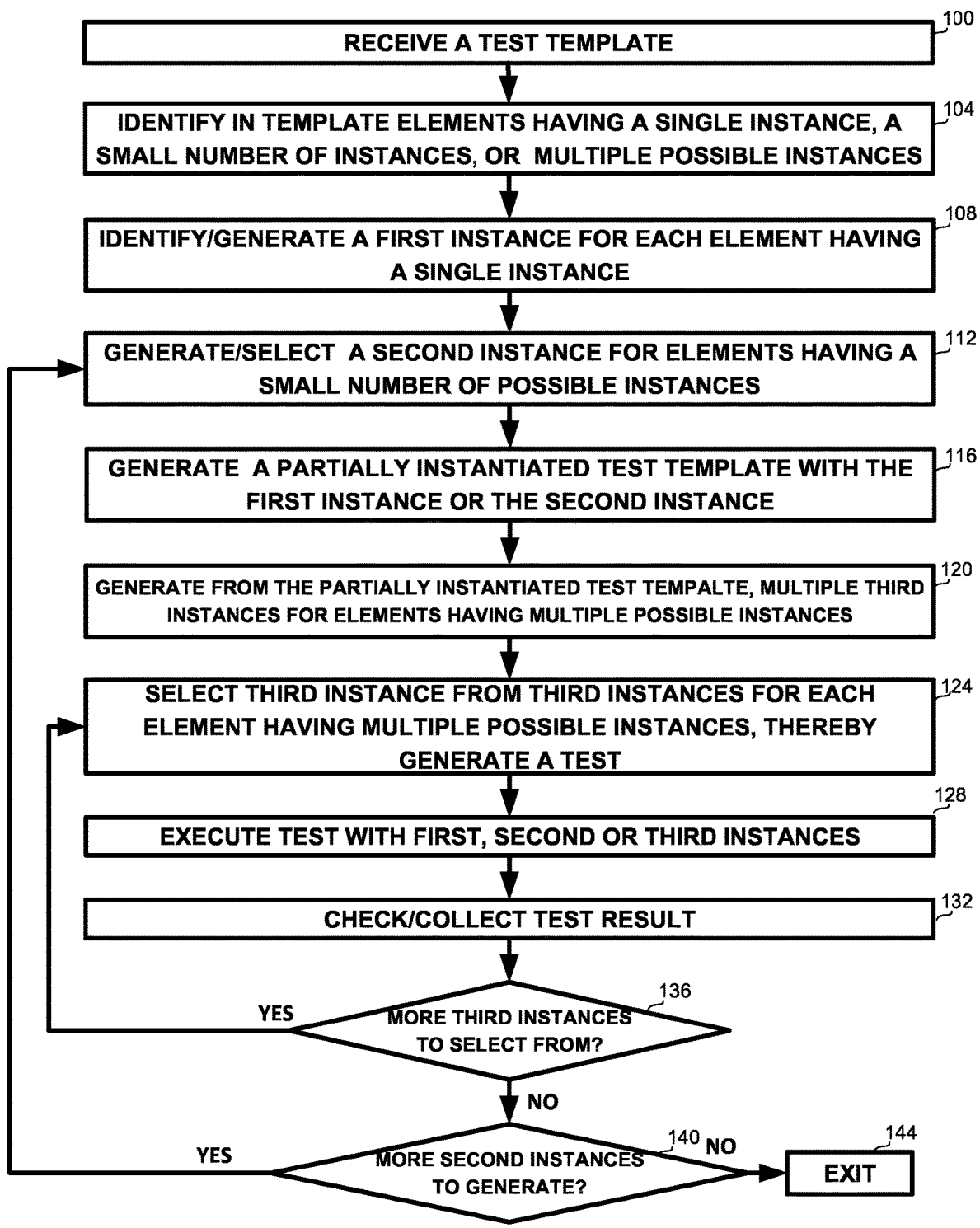

| | | | |
|---|---|---|---|
| 2010/0318850 A1* | 12/2010 | Copty | G06F 11/263 714/33 |
| 2011/0087861 A1* | 4/2011 | Bertacco | G06F 11/263 712/202 |
| 2011/0099424 A1* | 4/2011 | Rivera Trevino | G06F 11/263 714/25 |
| 2012/0117424 A1* | 5/2012 | Ben-Yehuda | G06F 11/263 714/26 |
| 2012/0131386 A1* | 5/2012 | Fournier | G06F 11/263 714/35 |
| 2013/0198567 A1* | 8/2013 | Ahmed | G06F 11/263 714/32 |
| 2013/0219215 A1* | 8/2013 | Katz | G06N 5/00 714/26 |
| 2014/0310693 A1* | 10/2014 | Elston | G06F 11/263 717/129 |
| 2017/0140839 A1 | 5/2017 | Doron et al. | |
| 2018/0225165 A1* | 8/2018 | McGarvey | G06F 11/079 |
| 2020/0218624 A1* | 7/2020 | Kolan | G06F 11/263 |

\* cited by examiner

METHOD AND APPARATUS FOR TEST GENERATION

TECHNICAL FIELD

The present disclosure relates to testing in general, and to a method and apparatus for generating tests for testing units, in particular.

BACKGROUND

The term testing generally relates to an investigation conducted to provide assess the quality of a product, and in particular a device under test (DUT), such as a device including hardware and/or software components. Testing can provide an objective, independent view of the DUT, and effective testing is crucial to achieving a competitive product in any area. Testing may be part of any stage of the product development, including design, unit testing, system testing, or the like.

Testing may be planned and implemented by generating and executing a plurality of tests for checking various aspects and operations of a unit in various configurations and under various states or conditions.

In particular, testing a computing device or system may include executing a series of tests, each test comprising a set of computer instructions, wherein one or more of the instructions may comprise one or more parameters. Each test may also be associated with constraints, which may indicate instructions which are illegal or have illegal parameters, illegal instruction combinations, or the like.

Thus, generating a series of tests in accordance with user's instructions or guidelines, wherein the tests may have to comply with one or more constraints may be a difficult task, which may require significant time and computing resources such as computing power or storage space.

BRIEF SUMMARY

One exemplary embodiment of the disclosed subject matter is a computer-implemented method comprising: obtaining a test template for testing a unit, the test template comprising a multiplicity of elements, including, at least, a first element and another element; generating a partially instantiated test template, wherein the partially instantiated test template comprises a first instance for the first element and the another element in an uninstantiated form; generating, based on the partially instantiated test template, a first test complying with the test template, wherein the first test comprises the first instance for the first element and an instance for the another element; executing the first test to obtain a first test result; generating, based on the partially instantiated test template, a second test complying with the test template, wherein the second test comprises the first instance for the first element and another instance for the another element, thereby using the first instance for said generating the first test and the second test; and executing the second test to obtain a second test result. The method can further comprise reporting the first test result and the second test result. Within the method, said generating a partially instantiated test template optionally comprises: identifying the first instance as a possible instantiation of the first element. The method can further comprise repeatedly performing generating, based on the partially instantiated test template, an additional test complying with the test template and executing the additional test, until each possible instance for the another element is utilized to generate a test. The method can further comprise repeatedly performing generating, based on the partially instantiated test template, an additional test complying with the test template and executing the additional test for a number of times smaller than a threshold number, wherein a different first instance is generated on each repetition. Within the method, the first element optionally has at most a threshold number of possible instances. Within the method, the another element optionally has more than the threshold number of possible instances. Within the method, the threshold number is optionally at least one and at most ten. Within the method, the first instance is optionally context-independent. Within the method, said generating the partially instantiated test template optionally comprises performing a selection of the instance using either random selection or exhaustive selection. Within the method, said generating the first test based on the partially instantiated test template, optionally comprises performing a selection of the another instance using either random selection or exhaustive selection. Within the method, said generating the first test based on the partially instantiated test template, optionally comprises: obtaining a Constraint Satisfaction Problem (CSP), wherein a solution to the CSP constitutes instances for a test for testing the unit and complying with the test template; and solving the CSP with the first instance assigned to the first element, thereby solving the CSP for fewer variables than a number of elements comprised in the test template. Within the method, the another element is optionally associated with a domain, the domain comprising the instance and the another instance. Within the method, the first element or the another element is optionally a computer instruction. Within the method, the first element or the another element is optionally a parameter for a computer instruction. Within the method, said generating the first test is optionally performed by a first thread of the unit, and said executing the first test is optionally performed by a second thread of the unit. Within the method, said generating the partially instantiated test template is optionally performed by a processor, and wherein said generating the first test template and said generating the second test template are performed by the unit, whereby shifting utilized computation resources from the unit to the processor.

Another exemplary embodiment of the disclosed subject matter is a system having a processor, the processor being adapted to perform the steps of: obtaining a test template for testing a unit, the test template comprising a multiplicity of elements, including, at least, a first element and another element; generating a partially instantiated test template, wherein the partially instantiated test template comprises a first instance for the first element and the another element in an uninstantiated form; generating by the processor, based on the partially instantiated test template, a first test complying with the test template, wherein the first test comprises the first instance for the first element and an instance for the another element; executing the first test to obtain a first test result; generating, by the processor based on the partially instantiated test template, a second test complying with the test template, wherein the second test comprises the first instance for the first element and another instance for the another element, thereby using the first instance for said generating the first test and the second test; and executing the second test to obtain a second test result. Within the system, the processor is optionally further adapted to repeatedly perform generating, based on the partially instantiated test template, an additional test complying with the test template and executing the additional test, until each possible instance for the another element is utilized to generate a test.

Yet another exemplary embodiment of the disclosed subject matter is a computer program product comprising a non-transitory computer readable medium retaining program instructions, which instructions when read by a processor, cause the processor to perform: obtaining a test template for testing a unit, the test template comprising a multiplicity of elements, including, at least, a first element and another element; generating a partially instantiated test template, wherein the partially instantiated test template comprises a first instance for the first element and the another element in an uninstantiated form; generating by the processor, based on the partially instantiated test template, a first test complying with the test template, wherein the first test comprises the first instance for the first element and an instance for the another element; executing the first test to obtain a first test result; generating, by the processor based on the partially instantiated test template, a second test complying with the test template, wherein the second test comprises the first instance for the first element and another instance for the another element, thereby using the first instance for said generating the first test and the second test; and executing the second test to obtain a second test result.

THE BRIEF DESCRIPTION OF THE SEVERAL VIEWS OF THE DRAWINGS

Figure 2:
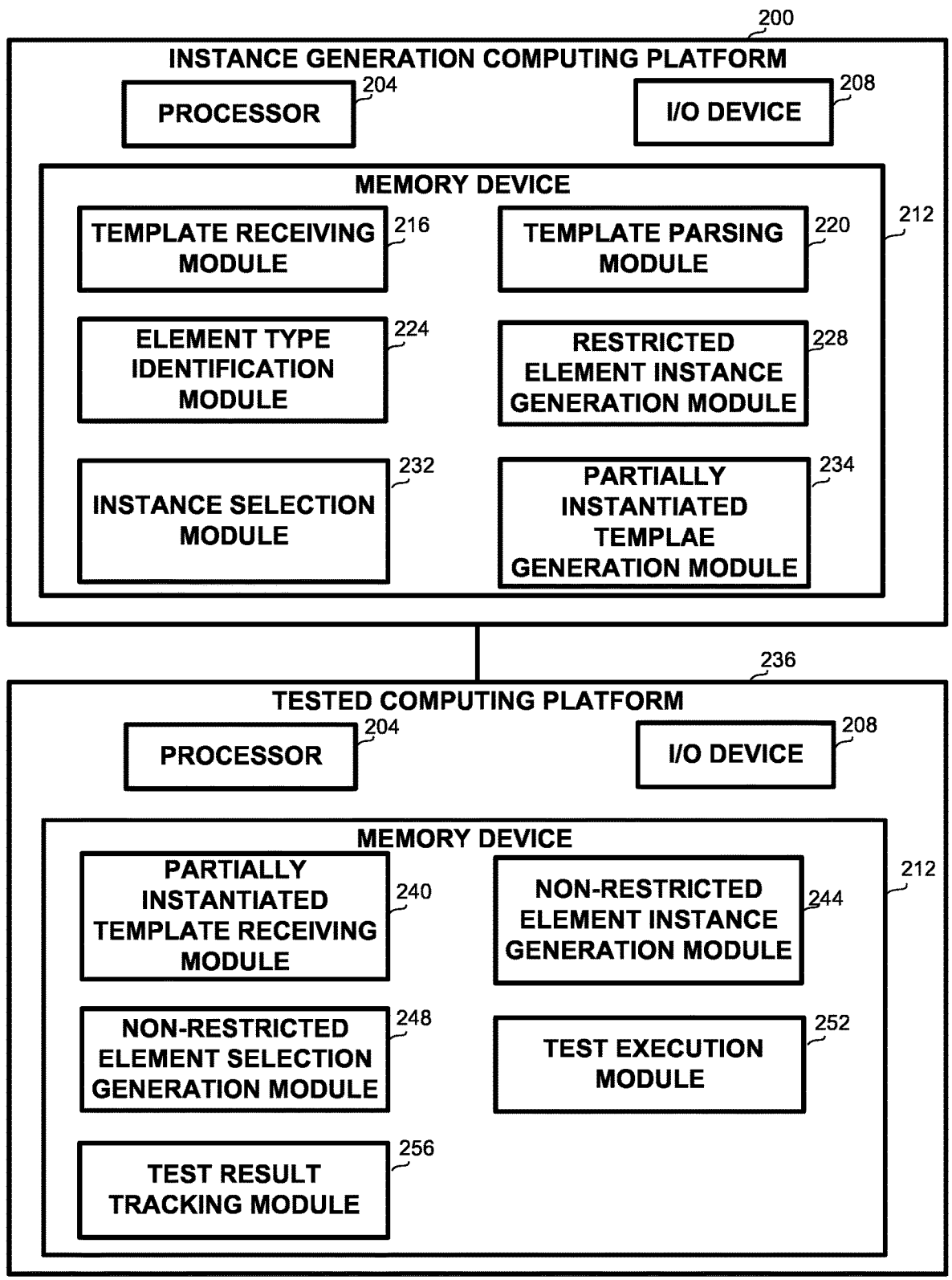

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 1 shows a flowchart diagram of a method of generating tests for testing a unit, in accordance with some exemplary embodiments of the disclosed subject matter; and FIG. 2 shows a block diagram of a computing device configured for generating tests for testing a unit, in accordance with some exemplary embodiments of the disclosed subject matter.

DETAILED DESCRIPTION

The term "template" used in this specification should be expansively construed to cover any kind of formulation or otherwise expressing or describing a test set comprising one or more tests to be generated. A template may include a multiplicity of building blocks, referred to as elements, wherein one or more instances may be generated upon each element. In some embodiments, an element may be a statement instructing how to generate a computer instruction. A template may be expressed in any agreed upon format or language.

The term "instance" or "instantiation" used in this specification should be expansively construed to cover any kind of one or more specific test elements, generated upon a statement. For example, an instance may comprise one or more executable computer instructions, each instruction having zero or more parameters. In another example, an instance may be a parameter of a computer instruction.

The term "generation" used in this specification should be expansively construed to cover any kind of creation of one or more instances upon a template statement.

Testing is an important part of the development of any new product. Testing can and should be integrated with any stage of the development, including design, implementation, unit testing, integration, or the like.

A particular type of testing relates to functional verification of systems, such as but not limited to modern multi-threaded processors. Generating multiple random, legal, multi-threaded, and variable test cases to be run on a DUT, is a complicated and lengthy task. Some verification environments, for example post-silicon or emulation, heavily rely on multi-pass consistency checking, where end-of-test results of multiple executions of the same test case are compared. In such environments, random generation is heavily constrained, in order to preserve the test goal and correctness according to the memory consistency model.

Some prior art techniques disclose methods for on-platform test generation and execution, which allow for full utilization and on-platform creation of infinite new test cases. However, such methods may take long time to generate the tests, especially relative to the resulting test execution time. On the other hand, generating in advance a large corpus of tests and storing them, may require significant storage space and a long loading time which may also hold back the test execution. Moreover, efficient storing and loading may not always be available when the unit is still under development.

Thus, one technical problem dealt with by the disclosed subject matter is the need to create test sets for testing a DUT, in the presence of one or more constraints, wherein the tests need to be generated in a timely manner, such that the testing stage does not take unnecessarily long time.

One technical solution comprises receiving a test template from a user, the test template comprising constraints and statements on how to generate tests, for example in a predefined language or format. One or more of the statements may include one or more elements which need to be instantiated. For example, elements may relate to selecting an add/subtract instruction and to selecting relevant parameters, and an instantiation thereof may be an instruction to add the values of a first register and a second register. Each combination of instances which is legal, i.e., complies with the constraints, provides for a specific test to be executed.

In accordance with some exemplary embodiments of the disclosure, the test template may be processed by a first engine or module, to identify one or more elements within the template which have a small number of possible instantiations, e.g., below a predetermined number such as one possible instantiation, two possible instantiations, ten possible instantiations, or the like. Such elements are referred to as "restricted elements".

An instantiation can then be generated for each such restricted element. A partially instantiated test template can then be generated, based on the test template with the generated instantiations for the restricted elements.

Once such one or more instantiations have been determined for the restricted elements, the test generation may continue on another computing platform, such as the DUT, thus providing for on-platform test generation.

Continuing the test generation may then comprise generating multiple instances for the other elements of the partially instantiated test template, referred to as "non-restricted elements".

Various tests may thus be generated upon the partially instantiated test template with the generated instance for each restricted element, and with selecting mutations of instances for the non-restricted elements. The generated tests may then be executed. Once the instantiations of the non-restricted elements are exhausted as no more selections are available, a predetermined number of tests have been generated, or another stopping criteria has been met, a different instance may be generated for one or more of the restricted elements. A multiplicity of instantiations may then be generated for the non-restricted elements, and the test generation and execution may proceed as above.

In some embodiments, all instantiations for the restricted elements may be generated in advance, and on each iteration after instantiations for the non-restricted elements have been exhausted (or another stopping criteria has been met), the instantiations for the restricted elements may be selected one after the other.

As mentioned above, instantiating the non-restricted elements may be done by a different module or engine than the one used for instantiating the restricted elements. The computing platform that generates the instantiations for the non-restricted elements may or may not be the DUT, i.e., the platform that executes the generated tests. Thus, test generation can be separated from the test execution. This provides for efficiency, as the test execution rate is not limited by the test generation rate on one hand, but it is not required to store a large corpus of tests and load them prior to execution.

In some embodiments, tests generated by one thread, for example tests comprising a specific instantiation for one restricted element, may be executed by another thread executed on the same processor, and vice versa, thus saving time and computing resources required for test generation.

The following is an example of a test template:

| 1. | REPEAT 2 times { |
| 2. | INSTRUCTION "load" |
| 3. | INSTRUCTION "stw r23, 0x10(r22)" |
| } | |

Line 2 relates to an element with multiple options, for example load byte, load word, load doubleword, or others. Whether this element is a restricted or non-restricted element depends on the threshold: if the threshold is, for example, 3 then this is a non-restricted element since there are more than three options, if the threshold is 10 then it is a restricted element.

Line 3 relates to a restricted element, since it can only be a "store word" command with specific parameters. The instantiation of the second element is thus constant, and generation can proceed with a partially instantiated test template.

Two possible tests generated upon the partially instantiated test template are shown below:

1.
ld r30,0x8(r13)//load doubleword
stw r23,0x10(r22)
lw r29,0x94(r16)//load word
stw r23,0x10(r22)

2.
lb r19,0x70(r16)//load byte
stw r23,0x10(r22)
ld r28,0xDC(r15)//load doubleword
stw r23,0x10(r22)

By not re-generating the restricted element, significant part of the test generation time may be saved. For example, in a specific implementation, 50% of the test generation time have been saved. However, other implementations can provide for saving smaller or larger parts of the test generation times.

One technical effect of the disclosure relates to pre-generating parts of tests for testing a DUT, by determining context-indifferent instantiations, which are constant for a large number of tests, or even for all tests, if there is exactly one possible instantiation. This provides for generating a partially instantiated test template and reduces the time and complexity of generating instantiations for the non-restricted elements for each test.

Another technical effect of the disclosure relates to partially decoupling the test generation from test execution. It will be appreciated that total decoupling may not always be desired. For example, in complex multi-threaded systems, the test suite may comprise thousands or more tests, such that storing and retrieving the test suite by each thread may take significant resources. Further, storing and retrieving the full test suite may not always be possible, for example in systems under development, for which storage devices and buses are not fully available yet.

Yet another technical effect of the disclosure relates to using tests that have been generated by one thread and are reused and executed by one or more other threads of the same computing platform such as the DUT, thus saving test generation time for the other threads.

Referring now to FIG. 1, showing a flowchart diagram of a method of generating tests for testing a unit, in accordance with some exemplary embodiments of the disclosed subject matter.

On step 100, a test template may be received. The test template may comprise one or more elements that need to be instantiated, wherein each combination of instances provides a test. Each such test may be checked to determine whether it complies with constraints. The constraints may also be part of the test template, or provided separately. The test template may be received from a user, for example as text, as voice, through a user interface, or the like. The test template may also be retrieved from a storage device, received over a communication channel, or the like. The test template may be in any predetermined language, format, or the like.

On step 104, elements of up to three types may be identified in the template. The first type relates to elements which have a single instance, such as a defined Application Programming Interface (API) (or no API. The line "INSTRUCTION "stw r23,0x10(r22)"" in the example above demonstrates an element of the first type.

The second type relates to elements having a number of possible instances below a predetermined threshold. Elements of the second type may be associated with some options to be randomly selected from. For example, if the threshold is 10, then the element "INSTRUCTION "load"" in the example above, has a number of possible instances below the threshold. As detailed above, elements of the first and second types are referred to as restricted elements.

The third type relates to elements having a number of possible instantiations larger than the threshold, for example the element "INSTRUCTION "load"" if the threshold is 3 or less. These elements enable the generation of different instructions, different initial conditions or different instruction execution ordering. The instantiation of these elements can be mutated as long as the resulting test is still legal, i.e., they constitute a valid command and complies with the constraints. Additional examples to such elements may include but are not limited to two loads from the same address, with different access length; don't care bits of instructions; general purpose registers of miscellaneous instructions; code inside a non-taken path of a branch; and power save instructions that change only micro-architecture state. It will be appreciated that elements can be used which change the context of a test, as long as the test correctness is preserved, e.g., translation aliasing wherein two virtual memory tables that translate to the same physical memory; control registers that affect the micro-architecture, but not the architectural machine state, or the like.

In some embodiments type first and second above may be unified, as detailed below. The elements types may be identified by comparison to a list of predetermined elements of each type, using a state machine, or the like.

On step 108, a first instance may be identified or generated for each element of the first type. In the example above, the instruction "stw r23,0x10(r22)" may be identified as an instance for the statement.

On step 112, a second instance may be generated for each element of the second type. The instance may be generated by randomization, by preparing ahead all possible instantiations and then repeatedly selecting therefrom, or the like.

On step 116, a partially instantiated test template may be generated, which comprises the instantiations for the elements of the first type and/or of the second type, and the elements of the third type in an uninstantiated form. The test may be generated by: obtaining a Constraint Satisfaction Problem (CSP) based on the test template and the constraints, wherein a solution to the CSP constitutes instances for a test for testing the unit and complying with the test template; and solving the CSP with the first instance assigned to the element of the first type, or the second instance assigned to the element of the second type, thereby solving a CSP with fewer variables than a number of elements comprised in the test template. However, any other method of generating one or more instances for each element of the third type may also be used.

On step 120, multiple possible instantiations may be generated for elements of the third type of the partially instantiated test template. In some embodiments, each element of the third type is associated with a domain, and all generated instantiations belong to the domain. In some examples and embodiments, all possible instantiations may be generated, while in other situations only a part of all possible instantiations may be generated. Step 120 may be performed at a later time and by a different module, engine or machine from the module, engine or machine which generated the instances for the elements of the first and second type.

On step 124, a third instance may be selected from the possible instantiations for each element of the third type. By selecting an instantiation for each such element, a complete test is generated. Step 124 is repeated multiple times, therefore at least a first test and a second test are generated.

On step 128 the generated test, comprising the instantiations for elements of the first, second and third types is executed. Execution may be performed by the DUT. i.e., the computing platform being tested. In some embodiments, generating the instances for the elements of the first, second, or third types may also be performed on the computer platform being tested, or by a different computing platform. In specific embodiments, generating the partially instantiated test template may be performed by a processor, while s generating the various tests is performed by the DUT, thereby shifting utilized computation resources from the DUT to the processor.

In some embodiments, if the resource of the DUT is expensive, for example there are not enough units to be tested, one or more of the tests may be performed by a simulator or emulator simulating or emulating the DUT.

On step 132 the results of the test execution may be collected, displayed, stored, checked by a user, or the like.

On step 136 it may be determined whether there are additional instances for elements of the third type that have been generated but have not been selected yet (wherein the instances of elements of the first and second types are maintained). If such elements exist, execution may return to step 124, wherein further instances for elements of the third type are selected, followed by test execution on step 128 and checking the test results on step 132.

If no elements of the third type that have been generated but have not been selected yet exist, it may be determined whether more instances for elements of the second type which have not been generated or selected yet exist. If such instances exist, then execution may return to step 112, wherein further instances are generated (or selected) for elements of the second type, followed by generating a partially instantiated test template on step 116, generating instances for elements of the third type on step 120, selecting instances for the elements of the third type on step 124, executing tests on step 124, and checking the results, as detailed above.

If no more instances for elements of the second type exist, or another stopping criteria has been met, testing may exit on step 144.

It will be appreciated that the same instances may be used multiple times, since a test may be comprised of multiple threads. Thus, the mix of the instructions chosen by different threads may be different. This is enabled since each thread generates instructions independent of the other threads, thus every such mix is a legal combination.

It will be appreciated that the first type of elements may be described as a specific case of the second type, such that no particular handling is required. Thus, steps 112 and 116 for generating instances for elements of the first and second types may be performed together. Then, on step 140 there will be no more second instances to generate or select since there is only one possible instance, and testing will end after a single iteration on the element of the second type (but possibly multiple iterations on the instances of elements of the third type).

It will be also appreciated that if multiple elements of any type exist, then in some embodiments looping over the instances may occur in parallel, such that on some iterations the instances of multiple elements of the first or second type change. In further embodiments, the loops may be nested such that instances of one element are traversed while an instance of another element remains fixed. In some situations, and depending on the requirements, and in particular coverage requirements, exhaustive search may be required in which all combinations are tested. In other embodiments, a predetermined number of tests may need to be performed, with or without further requirement on the tested instance combinations.

Referring now to FIG. 2, showing a block diagram of a system for generating tests and testing a unit.

The system comprises one or more instance generation computing platforms 200. In some embodiments, computing platform 200 may be a server, and provide services to one or more tested computing platforms 236. In other embodiments, computing platforms 200 and 236 may be implemented on the same computing device.

Computing platforms 200 and 236 may communicate via any communication channel, such as a Wide Area Network, a Local Area Network, intranet, Internet or the like.

Computing Platform 200 may comprise a Processor 204 which may be one or more Central Processing Unit (CPU), a microprocessor, an electronic circuit, an Integrated Circuit (IC) or the like. Processor 204 may be configured to provide the required functionality, for example by loading to memory and activating the modules stored on Storage Device 212 detailed below.

It will be appreciated that Computing Platform 200 may be implemented as one or more computing platforms which may be in communication with one another. It will also be appreciated that Processor 204 may be implemented as one or more processors, whether located on the same platform or not.

Computing Platform 200 may also comprise Input/Output (I/O) Device 208 such as a display, a pointing device, a keyboard, a touch screen, or the like. I/O Device 208 may be utilized to receive input from and provide output to a user, for example receive a test template, output test results, or the like.

Computing Platform 200 may also comprise a Storage Device 212, such as a hard disk drive, a Flash disk, a Random Access Memory (RAM), a memory chip, or the like. In some exemplary embodiments, Storage Device 212 may retain program code operative to cause Processor 204 to perform acts associated with any of the modules listed below or steps of the method of FIG. 1 above. The program code may comprise one or more executable units, such as functions, libraries, standalone programs or the like, adapted to execute instructions as detailed below.

Storage Device 212 may comprise Template Receiving Module 216, for receiving or retrieving a test template from a user, from a storage device, over a communication channel, or the like.

Storage Device 212 may comprise Template Parsing Module 220 and Element Type Identification Module 224. In some embodiments, Template Parsing Module 220 and Element Type Identification Module 224 may be implemented as one module, which identifies the element types during parsing. Element types may be identified by comparison to predefined strings or structures, in accordance with regular expressions, or the like.

Storage Device 212 may comprise Restricted Element Instance Generation Module 228, for generating one or more instances for a restricted type element, for example an element of the first type which has a single instantiation, or element of the second type that has a number of possible instantiations not exceeding a predetermined threshold. The instances can be generated based on given text, a lookup table, retrieval from a database, or the like.

Storage Device 212 may comprise Instance Selection Module 232, for selecting an instance which has not been previously selected from a multiplicity of generated instances for elements of the second type. Alternatively, a new instance may be generated every time instead of pre-generating a multiplicity of instances and selecting therefrom. Instance Selection Module 232 may maintain a data structure, a variable, or the like for keeping track of which the instances have been selected.

Storage Device 212 may comprise Partially Instantiated Template Generation Module 234, for generating a template based on the template received on step 216 and on the instances generated and selected for elements of the first type and the second type.

Computing Platform 236 may be any tested device, such as a computing platform being developed, or the like.

Computing Platform 236 may comprise Processor 204, I/O Device 208 and storage device 212 as detailed above for Computing Platform 200.

Computing Platform 236 may comprise Partially Instantiated Template Receiving Module 240, for receiving the partially instantiated test template generated by Partially Instantiated Template Generation Module 234.

Computing Platform 236 may comprise Non-Restricted Elements Instance Generation Module 244, for generating a multiplicity of instances for elements of the third type. Non-Restricted Elements Instance Generation Module 244 may be configured to generate all possible instances if the instances are countable, a predetermined number of instances, a random number of instances, or the like, for one or more non-restricted elements.

Computing Platform 236 may comprise Non-Restricted Elements Instance Selection Module 248, for selecting one or more of the instances generated by Non-Restricted Elements Instance Generation Module 244.

Computing Platform 236 may comprise test execution module 252 for executing a test once all elements have been instantiated. The tests may be executed by Processor 204 of tested Computing Platform 236 or by another processor. In further embodiments, Partially Instantiated Template Receiving Module 240, Non-Restricted Elements Instance Generation Module 244, and Non-Restricted Elements Instance Selection Module 248 may be executed by a different computing platform.

Computing Platform 236 may comprise Test Result Tracking Module 256, for reporting to a user, storing in a file or database, transmitting over a communication channel or taking any other action with results of tests executed by Test Execution Module 252.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   obtaining a test template for testing a unit, the test template comprising a multiplicity of uninstantiated elements, wherein the multiplicity of uninstantiated elements comprises at least a first element and another element;
   generating by a processor, a partially instantiated test template, wherein the partially instantiated test template comprises a first instance for the first element and the another element in an uninstantiated form, wherein the partially instantiated test template excludes an instance for the another element;
   generating by the unit, based on the partially instantiated test template, a first test complying with the test template, wherein the first test comprises the first instance for the first element and an instance for the another element;

executing the first test to obtain a first test result;

generating by the unit, based on the partially instantiated test template, a second test complying with the test template, wherein the second test comprises the first instance for the first element and another instance for the another element, thereby using the first instance for said generating the first test and the second test; and executing the second test to obtain a second test result;

wherein said generating the partially instantiated test template by the processor and said generating the first test by the unit and said generating the second test by the unit, shifts utilized computation resources from the unit to the processor.

2. The method of claim 1, further comprising reporting the first test result and the second test result.

3. The method of claim 1, wherein said generating a partially instantiated test template comprises: identifying the first instance as a possible instantiation of the first element.

4. The method of claim 1, further comprising repeatedly performing generating, based on the partially instantiated test template, an additional test complying with the test template and executing the additional test, until each possible instance for the another element is utilized to generate a test.

5. The method of claim 1, further comprising repeatedly performing generating, based on the partially instantiated test template, an additional test complying with the test template and executing the additional test for a number of times smaller than a threshold number, wherein a different first instance is generated on each repetition.

6. The method of claim 1, wherein the first element has at most a threshold number of possible instances.

7. The method of claim 6, wherein the another element has more than the threshold number of possible instances.

8. The method of claim 6, wherein the threshold number is at least one and at most ten.

9. The method of claim 8, wherein the first instance is context-independent.

10. The method of claim 1, wherein said generating the partially instantiated test template comprises performing a selection of the instance using either random selection or exhaustive selection.

11. The method of claim 1, wherein said generating the first test based on the partially instantiated test template, comprises performing a selection of the another instance using either random selection or exhaustive selection.

12. The method of claim 1, wherein said generating the first test based on the partially instantiated test template, comprises:
obtaining a Constraint Satisfaction Problem (CSP), wherein a solution to the CSP constitutes instances for a test for testing the unit and complying with the test template; and
solving the CSP with the first instance assigned to the first element, thereby solving the CSP for fewer variables than a number of elements comprised in the test template.

13. The method of claim 1, wherein the another element is associated with a domain, the domain comprising the instance and the another instance.

14. The method of claim 1, wherein the first element or the another element is a computer instruction.

15. The method of claim 1, wherein the first element or the another element is a parameter for a computer instruction.

16. The method of claim 1, wherein said generating the first test is performed by a first thread of the unit, and wherein said executing the first test is performed by a second thread of the unit.

17. A system for testing a unit, the system having a processor, the processor and the unit being adapted to perform:
obtaining a test template for testing the unit, the test template comprising a multiplicity of uninstantiated elements wherein the multiplicity of uninstantiated elements comprises at least, a first element and another element;
generating by the processor a partially instantiated test template, wherein the partially instantiated test template comprises a first instance for the first element and the another element in an uninstantiated form, wherein the partially instantiated test template excludes an instance for the another element;
generating by the unit, based on the partially instantiated test template, a first test complying with the test template, wherein the first test comprises the first instance for the first element and an instance for the another element;
executing the first test to obtain a first test result;
generating, by the unit, based on the partially instantiated test template, a second test complying with the test template, wherein the second test comprises the first instance for the first element and another instance for the another element, thereby using the first instance for said generating the first test and the second test; and
executing the second test to obtain a second test result,
wherein generating the partially instantiated test template by the processor and generating the first test and the second test by the unit shifts utilized computation resources from the unit to the processor.

18. The system of claim 17, further comprising repeatedly performing generating, based on the partially instantiated test template, an additional test complying with the test template and executing the additional test, until each possible instance for the another element is utilized to generate a test.

19. A computer program product for testing a unit, comprising a non-transitory computer readable medium retaining program instructions, which instructions when read by a processor, cause the processor and the unit to perform:
obtaining a test template for testing the unit, the test template comprising a multiplicity of uninstantiated elements, wherein the multiplicity of uninstantiated elements comprises at least, a first element and another element;
generating by the processor a partially instantiated test template, wherein the partially instantiated test template comprises a first instance for the first element and the another element in an uninstantiated form, wherein the partially instantiated test template excludes an instance for the another element;
generating by the unit, based on the partially instantiated test template, a first test complying with the test template, wherein the first test comprises the first instance for the first element and an instance for the another element;
executing the first test to obtain a first test result;
generating, by the unit based on the partially instantiated test template, a second test complying with the test template, wherein the second test comprises the first instance for the first element and another instance for the another element, thereby using the first instance for said generating the first test and the second test; and executing the second test to obtain a second test result, wherein generating the partially instantiated test template by the processor and generating the first test and the second test by the unit shifts utilized computation resources from the unit to the processor.

\* \* \* \* \*